(12) United States Patent
Hirata et al.

(10) Patent No.: US 7,885,737 B2
(45) Date of Patent: Feb. 8, 2011

(54) CONTROL UNIT FOR CONTROLLING AN ENGINE STOP OF A HYBRID VEHICLE

(75) Inventors: Takeshi Hirata, Zama (JP); Tsuyoshi Yamanaka, Yamato (JP); Hiroshi Kaneko, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 1084 days.

(21) Appl. No.: 11/609,099

(22) Filed: Dec. 20, 2006

(65) Prior Publication Data

US 2008/0071437 A1    Mar. 20, 2008

(30) Foreign Application Priority Data

Dec. 12, 2005    (JP) .............................. 2005-357078

(51) Int. Cl.
   *G05D 3/00*    (2006.01)
   *G05D 1/00*    (2006.01)
   *G06F 7/00*    (2006.01)
   *G06F 17/00*   (2006.01)
   *B60L 9/00*    (2006.01)
   *B60L 11/00*   (2006.01)

(52) U.S. Cl. ........................... 701/22; 701/67; 701/112; 180/65.1; 180/65.21; 180/65.25; 180/65.26; 180/65.28; 180/65.285; 477/3; 477/4; 477/5; 477/166; 477/178; 903/902; 903/903; 903/905; 903/906

(58) Field of Classification Search .................... 701/22, 701/67, 112; 180/65.1, 65.21, 65.25, 65.26, 180/65.28, 65.285; 903/902, 903, 905, 906; 477/3, 4, 5, 166, 178
   See application file for complete search history.

(56) References Cited

U.S. PATENT DOCUMENTS

| 5,697,466 | A | * | 12/1997 | Moroto et al. | ........... 180/65.25 |
| 5,775,449 | A | * | 7/1998 | Moroto et al. | ......... 180/65.235 |
| 5,826,671 | A | * | 10/1998 | Nakae et al. | ........... 180/65.235 |
| 5,935,040 | A | * | 8/1999 | Tabata et al. | .................... 477/3 |
| 6,019,183 | A | * | 2/2000 | Shimasaki et al. | .......... 180/165 |
| 6,026,921 | A | | 2/2000 | Aoyama et al. | |
| 6,083,138 | A | * | 7/2000 | Aoyama et al. | ................. 477/5 |
| 6,119,799 | A | * | 9/2000 | Morisawa et al. | ......... 180/65.25 |
| 6,307,277 | B1 | * | 10/2001 | Tamai et al. | .............. 290/40 C |
| 6,317,665 | B1 | * | 11/2001 | Tabata et al. | ................... 701/22 |
| 7,104,347 | B2 | * | 9/2006 | Severinsky et al. | ........ 180/65.23 |
| 7,168,515 | B2 | * | 1/2007 | Ito et al. | .................. 180/65.23 |
| 7,214,156 | B2 | * | 5/2007 | Oliver | ........................... 475/8 |
| 7,316,283 | B2 | * | 1/2008 | Yamamoto et al. | ..... 180/65.235 |

(Continued)

FOREIGN PATENT DOCUMENTS

EP    1619063 A2    1/2006

(Continued)

*Primary Examiner*—Dalena Tran
*Assistant Examiner*—Jaime Figueroa
(74) *Attorney, Agent, or Firm*—Global IP Counselors, LLP

(57) ABSTRACT

A hybrid vehicle control system for cutting off fuel to an internal combustion engine of hybrid vehicle while providing smooth transitions from a hybrid drive mode to an electric drive mode is provided. The hybrid vehicle control system includes an integrated controller configured to receive inputs corresponding to vehicle speed and an indicated driving force, and to select an appropriate mode transition pattern from a group of mode transition patters according to the change in indicated driving force.

15 Claims, 9 Drawing Sheets

U.S. PATENT DOCUMENTS

| | | | |
|---|---|---|---|
| 7,317,259 B2* | 1/2008 | Yamauchi | 290/40 C |
| 2001/0020789 A1* | 9/2001 | Nakashima | 290/40 C |
| 2003/0004031 A1* | 1/2003 | Philips et al. | 477/5 |
| 2003/0217876 A1* | 11/2003 | Severinsky et al. | 180/65.2 |
| 2004/0251064 A1 | 12/2004 | Imai | |
| 2004/0256165 A1* | 12/2004 | Tomita et al. | 180/65.2 |
| 2005/0099146 A1* | 5/2005 | Nishikawa et al. | 318/63 |
| 2006/0017414 A1* | 1/2006 | Joe et al. | 318/432 |
| 2006/0089235 A1* | 4/2006 | Kobayashi | 477/107 |

FOREIGN PATENT DOCUMENTS

| | | |
|---|---|---|
| JP | H11-082260 | 3/1999 |

* cited by examiner

CONTROL UNIT FOR CONTROLLING AN ENGINE STOP OF A HYBRID VEHICLE

CROSS-REFERENCE TO RELATED APPLICATIONS

This application claims priority under 35 U.S.C. §119 to Japanese Patent Application No. 2005-357078 filed on Dec. 12, 2005. The entire disclosure of Japanese Patent Application No. 2005-357078 is hereby incorporated herein by reference.

TECHNICAL FIELD

The present invention relates to a hybrid vehicle control system for decreasing or cutting off the fuel (hereinafter referred to as "defueling" or "stopping" the engine) to an internal combustion engine of a hybrid vehicle. In particular, the hybrid vehicle control system coordinates engine defueling with other driveline operations to ensure a smooth transition from a hybrid drive mode to an electric drive mode.

BACKGROUND OF THE INVENTION

The term "hybrid vehicle" typically refers to a vehicle that has both internal combustion and electric motor propulsion. In a conventional hybrid vehicle, a first clutch is installed between an internal combustion engine and an electric motor/generator, and a second clutch is installed between the motor/generator and the driving wheels. By such configuration, the conventional hybrid vehicle can provide two driving modes, that is, a hybrid drive mode and an electric drive mode. In the hybrid drive mode, the first and second clutches are engaged so that the vehicle may be driven by a torque generated from the engine and/or torque generated by the electric motor/generator. In the electric drive mode, the first clutch is disengaged and the vehicle is driven by a torque generated from the electric motor/generator only. By way of example, Japanese Patent Laid-Open Publication No. Hei 11-82260 discloses one of such conventional hybrid vehicles.

When the vehicle is in the electric drive mode, fuel to the internal combustion engine may be cut off, thereby improving fuel economy. In this application, the fuel cut off will be referred to as "defueling" the engine. However, when switching from the hybrid drive mode to the electric drive mode, the order between the engine defueling and the first clutch disengagement tends to affect the quality of driving.

BRIEF SUMMARY OF THE INVENTION

One aspect of the present invention is to provide a HEV control system for controlling the defueling of an engine of a hybrid vehicle in such a way that a smooth transition is made from a hybrid drive mode to an electric drive mode while maximizing overall fuel efficiency. It is believed that a smooth transition between modes will improve comfort and inspire driver confidence.

In one example of the present invention, a hybrid driving system includes: an engine; a motor/generator; a transmission; and, a first clutch installed between the engine and the motor/generator capable of continuously changing a torque transfer capacity.

In another aspect of the present invention a HEV control system performs a mode transition in which the first clutch is disengaged and the engine is defueled. This occurs when the hybrid vehicle transitions to an electric drive mode (uses the motor/generator) from a hybrid drive mode (engages the first clutch and uses the engine and motor/generator as a power source).

In another example of the present invention, the HEV control system comprises a means for detecting a change in the required driving force, as selected by the driver, when the driving mode is changed to the electric drive mode from the hybrid drive mode. Among various mode transition patterns, the engine controller selects an appropriate mode transition pattern upon considering the changed driving force when the hybrid drive mode transitions to the electric drive mode.

In another example, the HEV control system selects an appropriate mode transition pattern from a plurality of mode transition patterns upon considering the driving force selected by the driver when the hybrid drive mode is changed to the electric drive mode. For example, when the change in the driving force is only slight, defueling the engine may cause a sudden shock to the vehicle, which may make the driver feel uncomfortable. Therefore, a mode transition pattern for disengaging the first clutch prior to engine defueling is selected to prevent such a shock from occurring. In other examples, when the driver indicates that a more abrupt reduction in driving force is desired, a pattern of delaying the engine stop may result in unnecessary fuel consumption in order to maintain the operation of the engine. Thus, a mode transition pattern for stopping the engine prior to disengaging the first clutch may be chosen so as to minimize any unnecessary fuel consumption.

As a result, the braking/driving force can be provided without subjecting the driver to undesirable driving forces when changing the hybrid drive mode into the electric drive mode.

BRIEF DESCRIPTION OF THE DRAWINGS

The above descriptions and other features of the present invention will become apparent from the following description of preferred embodiments given in conjunction with the accompanying drawings.

DETAILED DESCRIPTION OF THE INVENTION

The control unit of the present invention will be fully discussed below in view of the provided figures.

Figure 1:
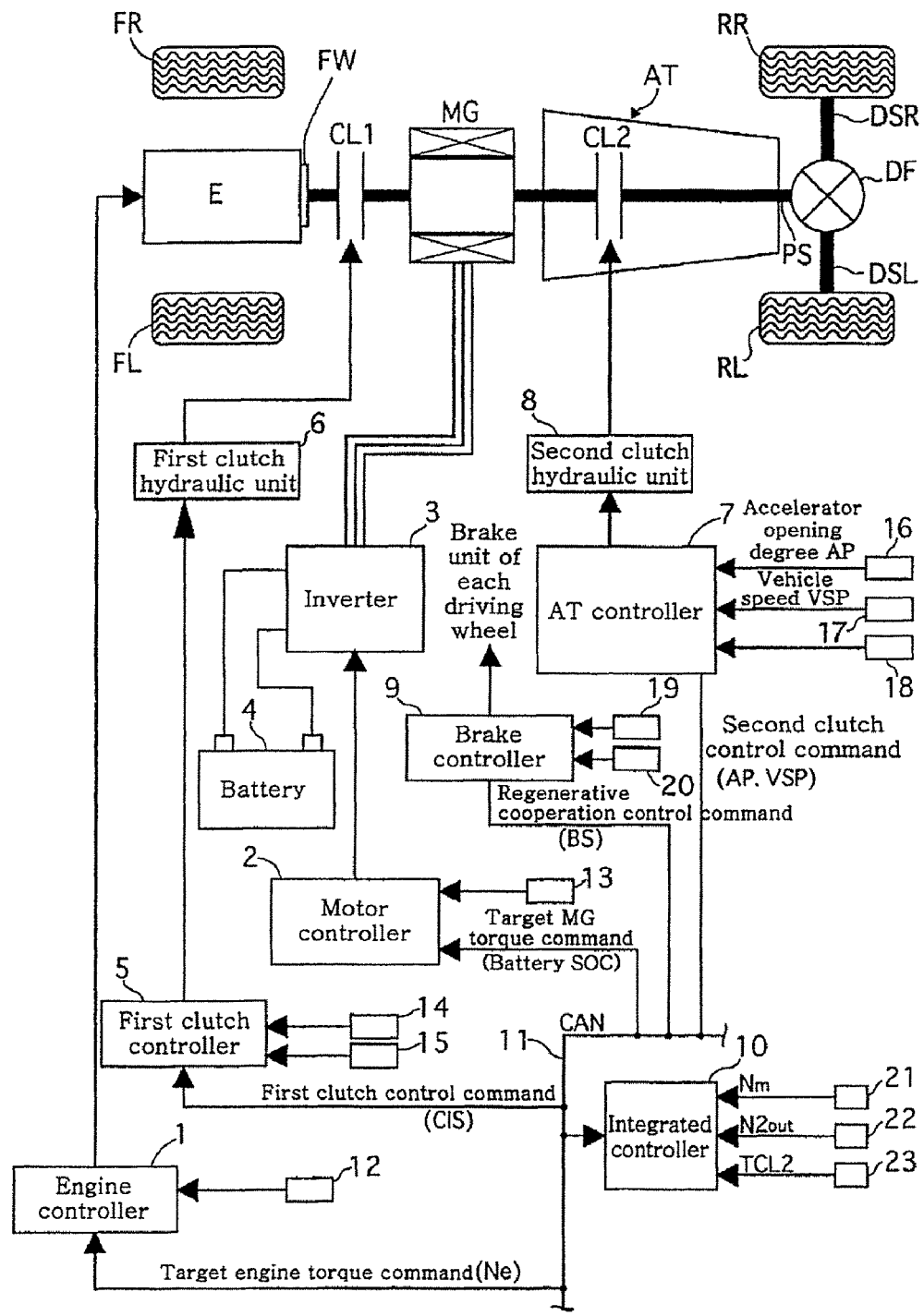
FIG. 1 is a block diagram illustrating a rear-wheel drive hybrid vehicle having a control unit for controlling engine defueling in accordance with a preferred embodiment of the present invention.

FIG. 1 is a block diagram illustrating a rear-wheel drive hybrid vehicle having a control unit for controlling an engine stop in accordance with a preferred embodiment of the present invention.

As shown in FIG. 1, a hybrid vehicle driveline includes an engine E, a flywheel FW, a first clutch CL1, a motor/generator MG, a second clutch CL2, an automatic transmission AT, a propeller shaft PS, a differential gear DF, a left-side driving shaft DSL, a right-side driving shaft DSR, a left-side rear wheel RL (driving wheel) and a right-side rear wheel RR (driving wheel).

The left-side front wheel is denoted as FL, whereas the right-side front wheel is denoted as FR.

The engine E is an internal combustion engine, such as a gasoline or diesel engine. Further, the opening of a throttle valve can be controlled based on a control command from an engine controller 1.

The first clutch CL1 is installed between the engine E and the motor/generator MG. The first clutch CL1 may be engaged, disengaged, or partially disengaged (e.g., slip engagement/disengagement) using the control fluid pressure generated by a first clutch hydraulic unit 6 based on control commands from a first clutch controller 5.

In one example, the motor/generator MG is a synchronous motor/generator having a permanent magnet embedded in a rotor and a stator coil wound around a stator. The motor/generator MG may be used as an electric motor, converting power stored in a battery 4 into rotational driving force.

The motor/generator MG may be controlled using 3-phase AC generated by an inverter 3 based on the control commands from a motor controller 2.

The motor/generator MG may also be used as a generator for charging battery 4 by generating an electromotive force at both ends of the stator coil when a rotor is rotated by an external force (hereinafter referred to as "regenerative force").

Further, the rotor of the motor/generator MG is coupled to an input shaft of the automatic transmission AT using a damper (not shown).

The second clutch CL2 is installed between the motor/generator MG and the left/right side rear wheel RL/RR. The second clutch CL2 may be engaged, disengaged or partially disengaged (e.g., slip engagement/disengagement) using the control fluid pressure generated by a second clutch hydraulic unit 8 based on the control commands from AT controller 7.

The AT controller 7 is configured to automatically shift the automatic transmission AT between transmission gear ratios (e.g., forward 5-speed and reverse 1-speed or forward 6-speed and reverse 1-speed) depending on the vehicle speed or the opening of an accelerator.

The second clutch CL2 uses certain frictional clamping elements among various frictional clamping elements utilized in each transmission stage of the automatic transmission AT. For example, a wet multi-plate clutch in which a proportional solenoid valve can continuously control the oil flow and fluid pressure may be used as the first clutch CL1 and the second clutch CL2.

The output shaft of the automatic transmission AT is coupled to the left-side rear wheel RL and the right-side rear wheel RR using the propeller shaft PS, the differential gear DF, the left-side driving shaft DSL and the right-side driving shaft DSR. The hybrid driving system has at least two driving modes depending on whether the first clutch CL1 is engaged or disengaged. One mode is an electric drive mode (hereinafter referred to as "EV mode"), which uses power only from the motor/generator. In EV mode, the first clutch CL1 is disengaged. Another mode is a hybrid drive mode (hereinafter referred to as "HEV mode") that uses power from both the engine E and the motor/generator MG. In the HEV mode, the first clutch CL1 is engaged.

Next, a HEV control system for controlling the hybrid vehicle will be described. In the example illustrated in FIG. 1, the HEV control system, includes the engine controller 1, the motor controller 2, the inverter 3, the battery 4, the first clutch controller 5, the first clutch hydraulic unit 6, the AT controller 7, the second clutch hydraulic unit 8, the brake controller 9 and an integrated controller 10. The engine controller 1, the motor controller 2, the first clutch controller 5, the AT controller 7, the brake controller 9 and the integrated controller 10 may be interconnected to each other using a CAN (Computer Area Network) communication line 11 or other suitable means enabling information interchange.

The engine controller 1 receives information regarding engine RPM from a sensor 12 configured to detect the engine RPM and a target engine torque command from the integrated controller 10. The engine controller 1 then outputs a command, for example, to a throttle actuator (not shown), wherein such a command controls the engine operating point (Ne, Te). Further, information regarding engine RPM Ne is transmitted to the integrated controller 10 using the CAN communication line 11. The motor controller 2 receives information from a resolver 13 configured to detect the rotational position of a rotor of the motor/generator MG. The motor controller 2 also receives a target motor/generator torque command from integrated controller 10. The motor controller 2 then outputs a command to the inverter 3, wherein such a command controls the motor operating point (Nm, Tm) of the motor/generator MG. Further, the motor controller 2 monitors the battery State of Charge (SOC), which represents the levels of charge of the battery 4. The information regarding the battery SOC is transmitted to the integrated controller 10 using the CAN communication line 11. Such information can also be used as the control information of the motor/generator MG.

The first clutch controller 5 receives sensor information from the first clutch hydraulic sensor 14 and the first clutch stroke sensor 15. The first clutch controller 5 also receives a first clutch control command from the integrated controller 10. The first clutch controller 5 then outputs a command for controlling the engagement and disengagement of the first clutch CL1. Further, the information of the first clutch stroke C1S is transmitted to the integrated controller 10 using the CAN communication line 11.

The AT controller 7 receives the information from the sensor 16 (detects the degree of opening of the accelerator), the vehicle speed sensor 17 and the second clutch hydraulic sensor 18. The AT controller 7 then outputs a command to the second clutch hydraulic unit 8 within the AT hydraulic control valve. Such a command controls the engagement and disengagement of the second clutch CL2 according to the second clutch control command from the integrated controller 10. Further, the information regarding the opening of the accelerator AP and the vehicle speed VSP is transmitted to the integrated controller 10 using the CAN communication line 11.

The brake controller 9 receives information from a brake stroke sensor 20 and a wheel speed sensor 19 configured to detect the speeds of all four wheels. For example, when a brake pedal is pressed down and the regenerative braking force is determined to be insufficient for the braking force indicated by a brake stroke BS, a regenerative cooperation brake control is performed based on a regenerative cooperation control command from the integrated controller 10. The regenerative braking force may thus be augmented by mechanical braking force (hydraulic or motor braking force).

The integrated controller 10 controls the entire energy consumption of a vehicle so as to allow the vehicle to operate with maximum efficiency. The integrated controller 10 inputs the information obtained using the CAN communication line 11 as well as the information from a motor RPM sensor 21, a second clutch output RPM sensor 22 (detects the output RPM N2 from the second clutch) and a second clutch torque sensor 23 (detects the torque TCL2 of the second clutch).

The integrated controller 10 controls the operation of the engine E via a control command from the engine controller 1, and controls the operation of the motor/generator MG via a control command from the motor controller 2. Further, the integrated controller 10 implements the engagement/disengagement control of the first clutch CL1 via a control command from the first clutch controller 5 and the engagement/disengagement control of the second clutch CL2 via a control command from the AT controller 7.

Figure 2:
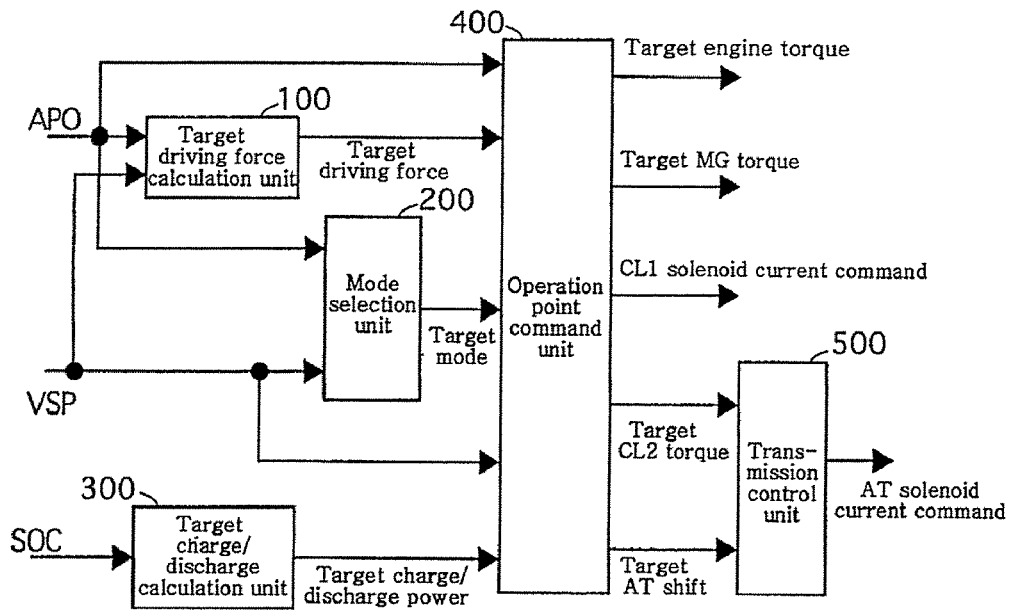
FIG. 2 is a block diagram illustrating a calculation processing program in an integrated controller.

Hereinafter, a control procedure in the integrated controller 10, will be described with respect to the example illustrated in FIG. 2. In one example, the control procedure in the integrated controller 10 can be performed with a control period of 10 msec.

The integrated controller 10 includes a target driving force calculation unit 100, a mode selection unit 200, a target charge/discharge calculation unit 300, an operating point command unit 400 and a transmission control unit 500.

Figure 3:
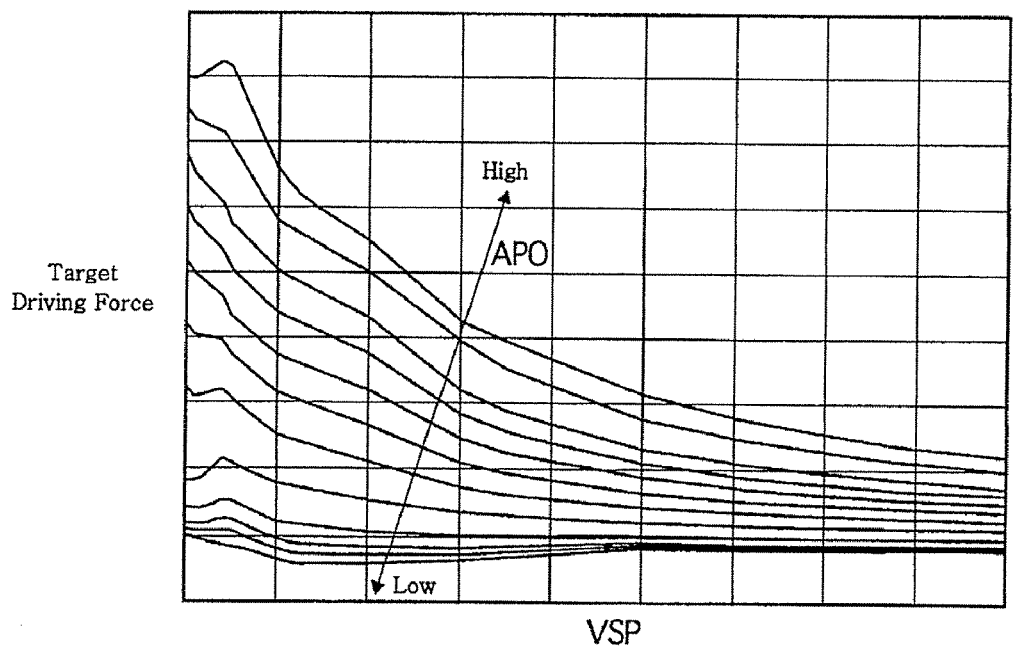
FIG. 3 illustrates an exemplary map for calculating a target driving force using a target driving force calculating unit shown in FIG. 2.

The target driving force calculation unit 100 receives signals corresponding to the accelerator opening degree APO and the vehicle speed VSP and calculates a target driving force $tF_0O$ by using the target driving force map shown in FIG. 3. The APO corresponds to an indicated driving force indicated by the driver through operation of the accelerator pedal.

Figure 4:
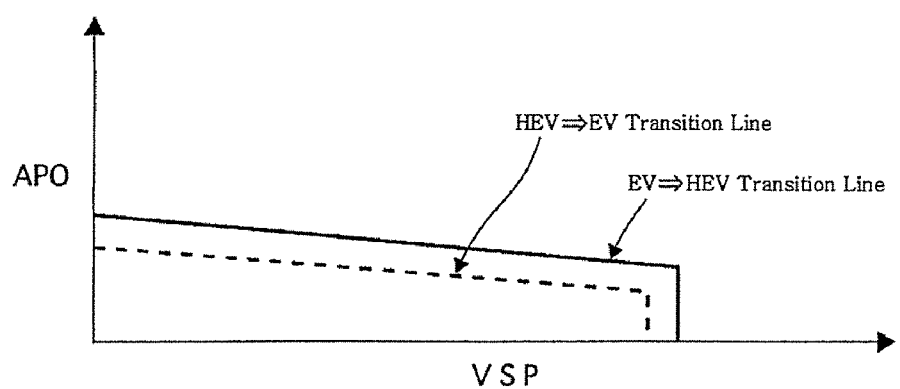
FIG. 4 illustrates an exemplary map for selecting a target mode using a mode selection unit shown in FIG. 2.

The mode selection unit 200 also receives the accelerator opening degree APO input and the vehicle speed VSP input and calculates a target mode by using the EV-HEV selection map shown in FIG. 4. The mode selection unit 200 outputs the target mode to the operating point command unit 400.

Figure 5:
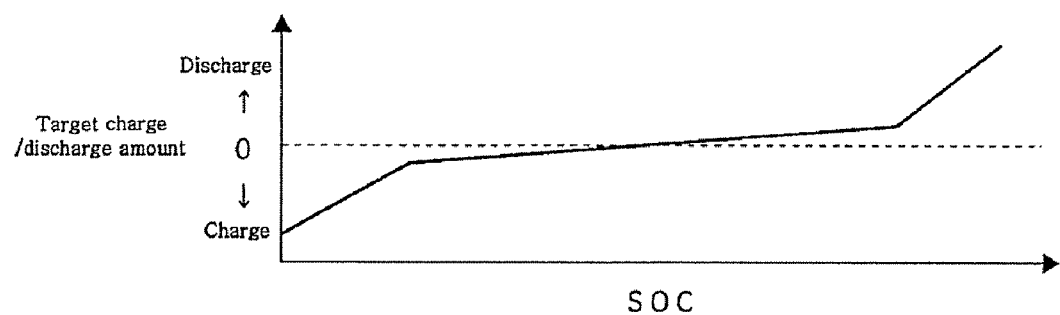
FIG. 5 illustrates an exemplary map for calculating a target charge/discharge power using a target charge/discharge power calculating unit shown in FIG. 2.

The target charge/discharge calculation unit 300 calculates a target charge/discharge electric power tP from the battery SOC by using the target charge/discharge amount map shown in FIG. 5. When the battery SOC is less than a desired value, the HEV mode becomes the target mode.

The operating point command unit 400 receives signals corresponding to the accelerator opening degree APO, the target driving force $tF_0O$, the target mode, the vehicle speed VSP and the target charge/discharge electric power tP. The operating point command unit 400 calculates a target transitional torque of the engine, a target torque of the motor/generator, a target torque transfer capacity of the second clutch, a target shift of the automatic transmission and a command of the first clutch solenoid current. The first clutch solenoid current command is indicative of a desired clutch torque transfer capacity.

The transmission control unit 500 receives signals from the operating point command unit 400 corresponding to the target torque transfer capacity of the second clutch, and a target shift of the automatic transmission, and drives and controls a solenoid valve in the automatic transmission AT to achieve the target torque transfer capacity of the second clutch and the target shift of the automatic transmission.

Figure 6:
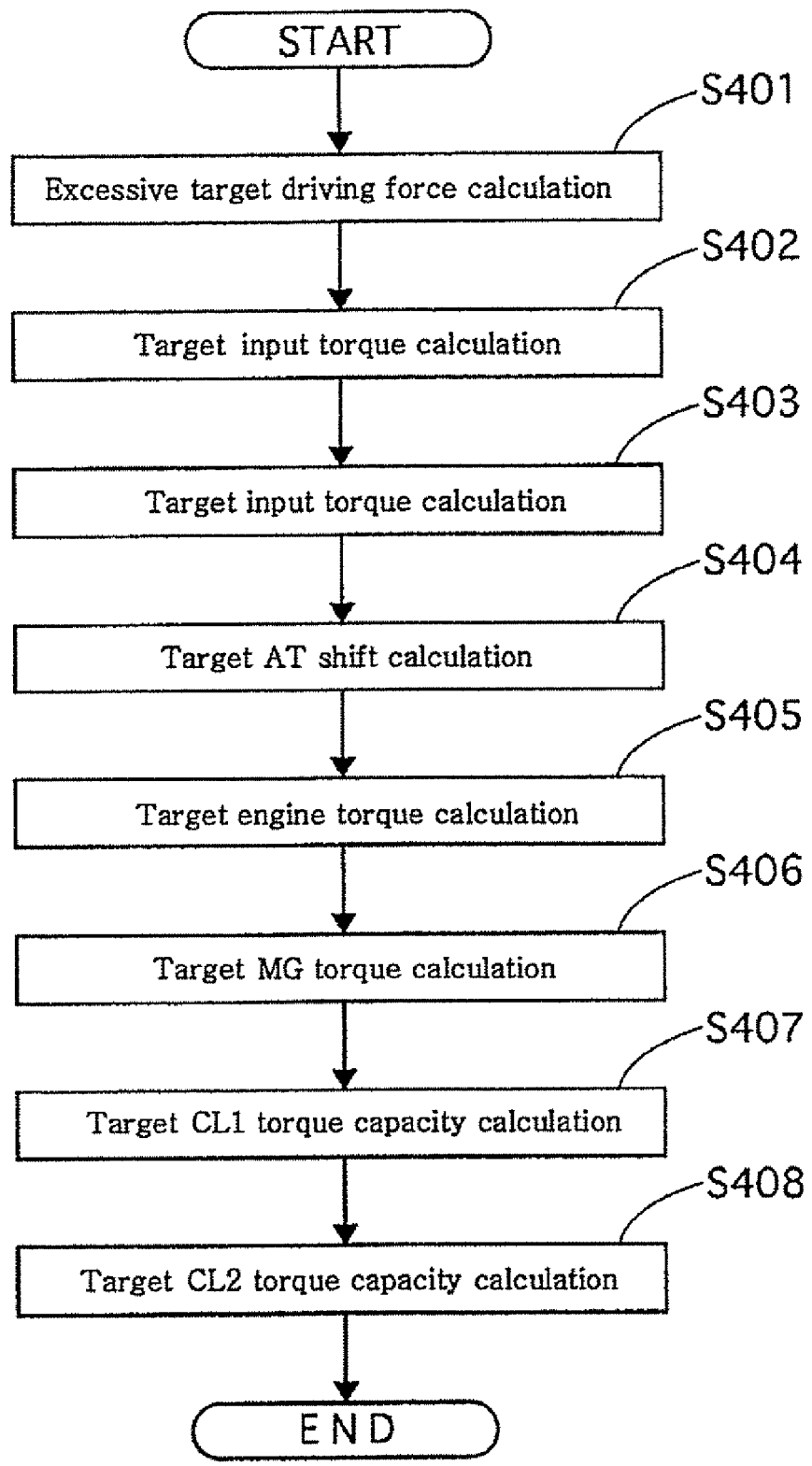
FIG. 6 is a flow chart illustrating a calculating process of an operating point command unit shown in FIG. 2 for determining each operation point.

Referring to FIG. 6, a flow chart according to one example of the calculation procedure of an operation point command is shown. The operation point command is calculated in the operating point command unit 400 of the integrated controller 10, the steps of which are described below.

In step S401, a transition target driving force $tF_0$ is calculated as a function of the target driving force $tF_0O$. For example, the transition target driving force $tF_0$ can be an output of a low-pass filter with a predetermined time constant, wherein such a filter has an input of the target driving force $tF_0O$.

In step S402, a target input torque etin of an automatic transmission AT is calculated by using the following equation:

$$tTin = tF_0 * rt / if / iG \quad (1)$$

wherein "rt" is a radius of a tire, "if" is a final gear ratio and "iG" is an actual gear shift ratio of an automatic transmission.

Figure 7:
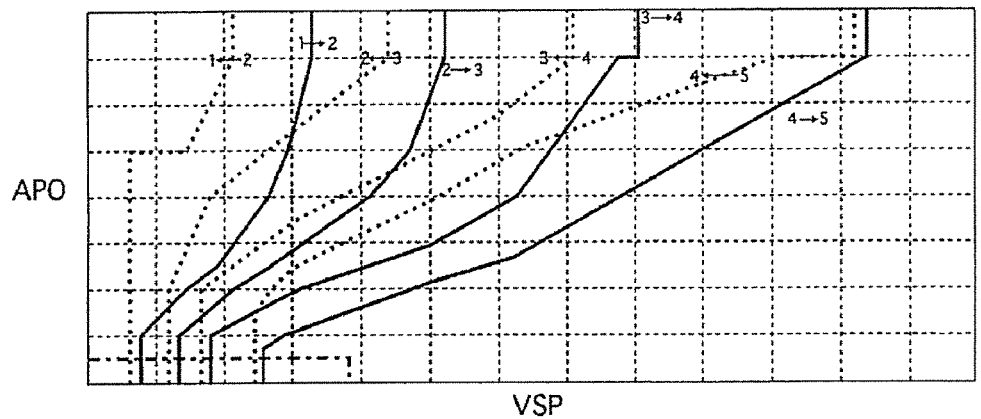
FIG. 7 illustrates an exemplary shift map for calculating a target automatic transmission shift shown in FIG. 6.

In step S403, a target shift of an automatic transmission from an accelerator opening degree APO and vehicle speed VSP is calculated by using a shift map shown in FIG. 7. In FIG. 7, the solid line depicts the up-shift line, while the broken line depicts the down-shift line.

In step S404, a mode is selected according to the target mode. Normally, a vehicle is driven in the EV or HEV mode.

Figure 8:
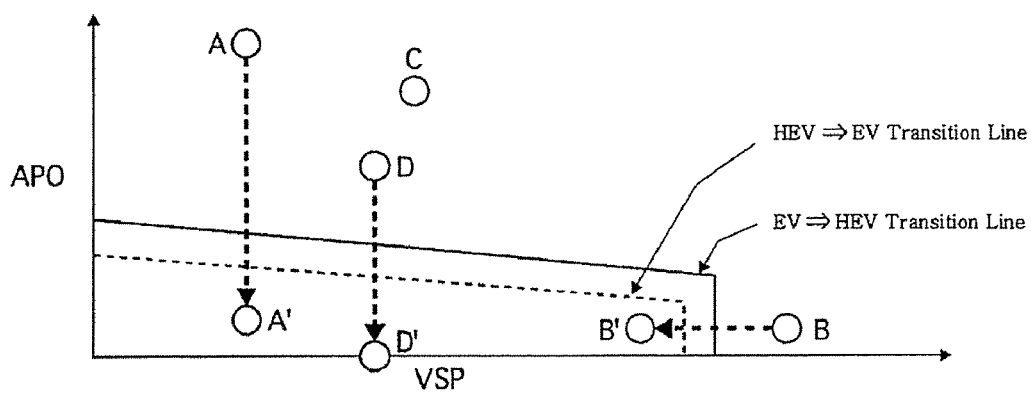
FIG. 8 illustrates an exemplary operation point map for changing a target mode as determined in FIG. 6 from an EV mode to a HEV mode.

However, as shown in FIG. 8, the most proper mode transfer pattern is selected from the three mode transfer patterns when transitioning from the HEV mode to the EV mode so as to accommodate the change in the driving force in the following situations.

- An accelerator pedal is released from point A (above the HEV-->EV transition line) to A', (crossing below the HEV-->EV transition line). In this pattern, the required driving force selected or indicated by the driver is decreased.
- the vehicle speed decreases from point B to B', crossing the HEV-->EV transition line.
- engine defueling is required and the battery SOC rises during normal driving in the HEV mode at point C (in this example, there may be only a slight change in the required driving force indicated by the driver).
- the accelerator pedal is released from Point D to Point D', crossing the HEV-->EV transition line, and the brake pedal is applied (in this example, the required driving force is rapidly decreased).

In step S405, the ideal engine torque tTe0 is calculated by using the following equation from the target input torque tTin, the input of automatic transmission RPM Nin and the engine RPM Ne.

$$tTe0 = (tTin * Nin - tP) / Ne \quad (2)$$

Figure 9:
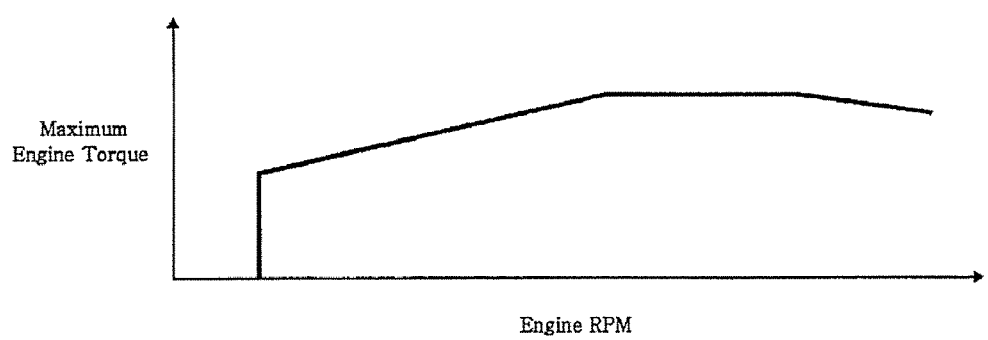
FIG. 9 illustrates an exemplary map of maximum torque vs. engine RPM used for calculating a target engine torque shown in FIG. 6.

The target engine torque tTe may be obtained using the maximum engine torque map shown in FIG. 9. In the EV mode, the target engine torque tTe is zero.

In step S406, the target motor/generator torque tTm is calculated by using the following equation, provided that the mode is either EV or HEV mode.

However, if the mode is changed, then the target motor/generator torque is determined during the mode transition.

$$tTm = tTin - tTe \quad (3)$$

In step S407, the target torque transfer capacity of the first clutch becomes zero (i.e., disengaged) in the EV mode. However, the target torque transfer capacity of the first clutch becomes a maximum value in the HEV mode.

If the mode is changed, then the target torque transfer capacity of the first clutch is determined during the mode transition.

In step S408, a target torque transfer capacity of the second clutch tcTcl2 is a proximate value close to the maximum driving force evTmax in the EV mode and becomes a maximum value in the HEV mode.

If the mode is changed, then step S408 determines the target torque transfer capacity of the second clutch tcTcl2 during the mode transition.

Figure 10:
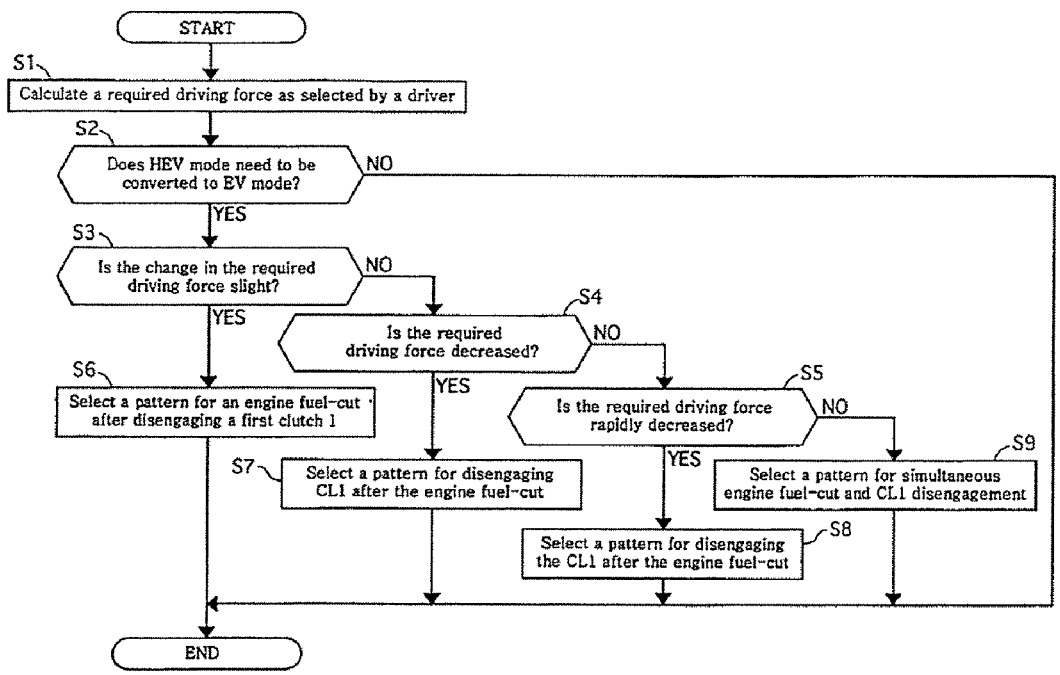
FIG. 10 is a flow chart showing a process of controlling an engine stop performed in the integrated controller shown in FIG. 2.

Referring to FIG. 10 a flow chart showing one example of a process of implementing an engine defueling control is illustrated. This process may be performed by the integrated controller 10. Each step performed by the engine defueling control means will be described below.

In step S1, the driving force indicated by the accelerator and the braking force applied by the driver are calculated, then step S1 proceeds to step S2.

In step S2, it is determined whether a mode transition from the HEV mode to the EV mode is requested. If the answer is "Yes," then step S2 goes to step S3. However, if the answer is "No," then step S2 goes to the end.

In step S3, it is determined whether there is only a slight change in the required driving force. If the answer is "Yes," then step S3 proceeds to step S6. However, if the answer is "No," then step S3 proceeds to step S4.

In step S4, it is determined whether the required driving force is decreased. If the answer is "Yes," then step S4 proceeds to step S7. However, if the answer is "No," then step S4 proceeds to step S5.

In step S5, it is determined whether the required driving force is rapidly decreased. If the answer is "Yes," then step S5 proceeds to step S8. However, if the answer is "No," then step S5 proceeds to step S9.

In step S6, when the change in the required driving force is determined to be slight compared to the predetermined value in step S3, a first mode transition pattern (shown in FIG. 11) in which the first clutch is disengaged prior to the engine defueling is selected. Step S6 then proceeds to the end.

In step S7, when the required driving force is determined to be decreased, a second mode transition pattern (shown in FIG. 12) in which the engine is defueled prior to disengaging the first clutch is selected. Step S7 then proceeds to the end.

In step S8, when the required driving force is determined to be rapidly decreased (more than the predetermined ratio), a third mode transition pattern (shown in FIG. 13) in which the first clutch disengagement and the engine defueling is simultaneously performed is selected. Step S8 then proceeds to the end.

In step S9, when the required driving force is determined to be increased, the second mode transition pattern (shown in FIG. 12) in which the engine is defueled prior to disengaging the first clutch is selected. Step S9 then proceeds to the end.

When switching from the HEV mode to the EV mode, a conventional hybrid vehicle may provide at least three mode transition patterns depending on the engine defueling and the first clutch disengagement (i.e., transition from first clutch disengagement to engine defueling, transition from engine stop to first clutch disengagement, and simultaneous performance of first clutch disengagement and engine defueling). However, such a conventional hybrid vehicle does not achieve the benefits of the present invention when the mode transition pattern is not properly selected according to the desired driving force.

In the present invention, however, the HEV control system includes means for controlling the engine defueling, which selects an appropriate mode transition pattern among various mode transition patterns, upon evaluating the driving force indicated by the driver, when the vehicle transitions from the HEV mode to the EV mode. Thus, the HEV control system of the present invention can provide optimal braking/driving force without affecting driving comfort or quality when changing from the HEV mode to the EV mode.

Specifically, the HEV control system includes Integrated Controller 10, which is configured to select an appropriate mode transition pattern among various mode transition patterns, upon considering the driving force selected by the driver, when the vehicle transitions from the HEV mode to the EV mode. Thus, Integrated Controller 10 provides an engine stop control means.

For example, when the change in the driving force is only slight, a sudden shock to the vehicle may be caused by cutting fuel to the engine which may make the driver feel uncomfortable. Therefore, a mode transition pattern for disengaging the first clutch prior to the engine defueling is selected to prevent such a shock from occurring.

Further, when the required driving force selected by the driver is decreased, a pattern of delaying the engine stop may result in unnecessary fuel consumption in order to maintain the operation of the engine. Thus, a mode transition pattern for performing the engine defueling prior to disengaging the first clutch should be chosen so as to minimize any unnecessary fuel consumption.

As a result, the braking/driving force can be provided without affecting driving comfort or quality when changing the HEV mode to the EV mode.

In the HEV control system of the present invention, the engine stop control means has the following three mode transition patterns: a first pattern for stopping the engine E after disengaging the first clutch CL1; a second pattern for disengaging the first clutch CL1 after stopping the engine E; and a third pattern for simultaneously stopping the engine E and disengaging the first clutch CL1.

Thus, an appropriate mode transition pattern can be selected among said mode transition patterns, thereby providing a wide range of selection in terms of mode transition patterns to accommodate various changes in the driving force.

When it is desired to transition from the HEV to the EV mode and there is only a slight change in the required driving force, the following steps occur in sequence: S1→S2→S3→S6 (shown in FIG. 10). In step S6, the first mode transition pattern for performing the engine stop after disengaging the first clutch CL1 is selected, as shown in FIG. 1.

Figure 11:
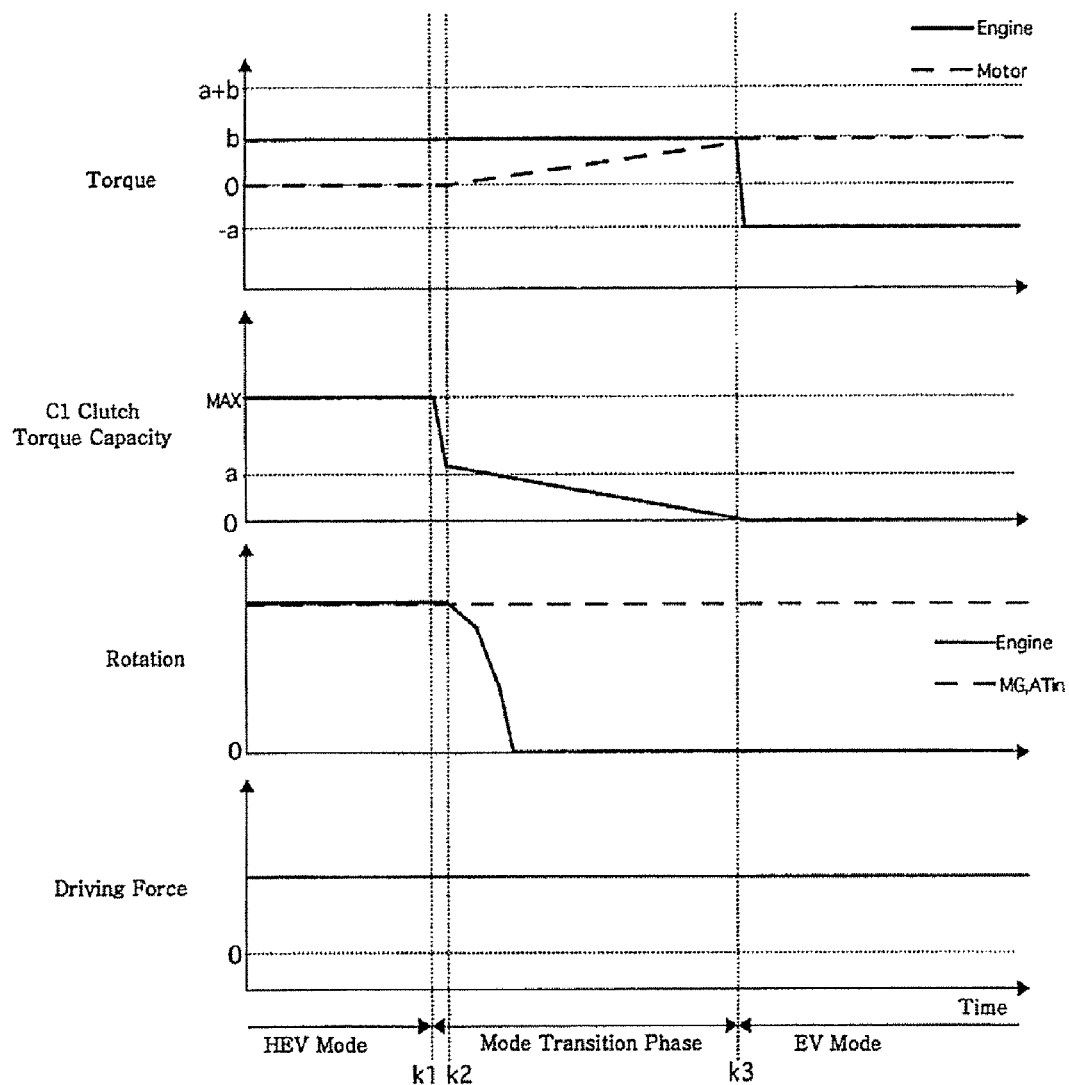
FIG. 11 is a diagram showing a mode transition pattern (first pattern) in which the first clutch disengagement is performed prior to the engine stop when the HEV mode is changed to the EV mode in the engine stop control.

Referring now to FIG. 11, there is shown a mode transition for stopping the engine E after disengaging the first clutch CL1. In the chart shown in FIG. 11, the time before reference symbol k1 indicates the HEV mode, whereas the time between reference symbols k1-k3 indicates a mode transition from the HEV mode to the EV mode (hereinafter referred to as "mode transition phase"). The disengagement of the first clutch CL1 and the defueling of the engine E are performed by cooperatively controlling the engine E, the motor/generator MG and the first clutch CL1. The time after reference symbol k3 indicates the EV mode.

The HEV mode will be first described. A target input torque tTin of the automatic transmission AT is calculated by using the following equation.

$$tTin=tF0*rt/if/iG \quad (1)$$

wherein "rt" is a radius of the tire, "if" is a final gear ratio and "iG" is the actual gear ratio of an automatic transmission shaft. Next, a target torque tTm of a motor/generator is calculated by using the following equation. However, if the mode is changed, then the target torque of the motor/generator is determined during the mode transition.

$$tTm=tTin-Te \quad (3')$$

wherein "Te" is an engine torque, which is estimated using a first delay of time constant 10 msec and an engine torque command.

Next, a mode switching phase is described. Reference symbol k1 indicates the time in which a mode transition to the EV mode has already started and the disengagement of the first clutch CL1 commences. Thus, the torque transfer capacity of the first clutch is decreased. Here, the torque transfer capacity of the first clutch was decreased nearly to a threshold torque transfer capacity (a). Reference symbol k2 indicates the time when the first clutch CL1 begins to slip because the torque transfer capacity of the first clutch CL1 has been reduced below the threshold torque transfer capacity (a) of the first clutch CL1. At the time point represented by reference symbol k2, cooperative control of the first clutch CL1 and the motor/generator MG begins. A target torque tTm of the motor/generator, for compensating the drag torque of the first clutch CL1, is calculated by using equation (3").

A target motor/generator torque tTm, for compensating drag torque transfer capacity of the first clutch CL1, is calculated by using the following equation.

$$tTm=tTin-Tcl1 \quad (3'')$$

wherein Tcl1 is a torque transfer capacity of the first clutch when the clutch is slipping. The torque transfer capacity is proportional to the fluid pressure. Thus, the first clutch torque Tcl1 can be precisely estimated by using a filter based on the actual fluid pressure in response to a command, based on experimental results, although there is a response delay of the fluid pressure to such a command. The driving force does not change by using the target torque tTm of the motor/generator.

Next, the EV mode will be described below. Reference symbol k3 indicates the time when the torque transfer capacity of the first clutch CL1 goes to zero and the first clutch CL1 is completely disengaged so as to achieve the EV mode. Also, at the time point represented by reference symbol k3, the engine E is defueled. Since the first clutch has been completely disengaged, the defueling of the engine E does not affect the driving power. Further, similar to the HEV mode, a target motor/generator torque tTm in the EV mode can be obtained by using equation (2). However, the engine torque Te should be zero since the first clutch CL1 has been disengaged in the EV mode.

As described above, the engine stop control means selects a first pattern, which stops the engine E after disengaging the first clutch CL1, if the required driving force as selected by the driver is only slightly decreased when the mode transitions from the HEV mode to the EV mode. For example, if the engine E is defueled while the torque transfer capacity of the first clutch CL1 is maintained, then such stoppage will produce a sudden shock (a change in the driving force), which will inevitably make the driver feel uncomfortable. However, such a drawback can be overcome by selecting the first pattern, which defuels the engine E after disengaging the first clutch CL1. As such, even though there is only a slight change in the driving force, the mode transition from the HEV mode to the EV mode can be accomplished without causing a shock produced by the engine defueling.

According to the HEV control system of the present invention, when the mode transitions from the HEV mode to the EV mode, the engine stop control means compensates a torque change caused by the disengagement of the first clutch CL1 using a torque of the motor/generator MG. If the disengagement of the first clutch CL1 is performed without any torque compensation by the motor/generator MG, then the driving force will be decreased during the mode transition phase. Since the driving force tends to decrease in spite of only a slight change in the required driving force, some discomfort may be felt by the driver. However, such a drawback can be overcome by compensating a torque change accompanied by the disengagement of the first clutch (CL1) using the motor/generator (MG) torque. As shown in FIG. 11, such compensation helps ensure that the driving force remains consistent, thereby improving the quality of driving.

In the HEV control system of the present invention, the engine stop control means immediately lowers the torque transfer capacity of the first clutch CL1 to the threshold torque transfer capacity (a) when disengaging the first clutch CL1. Similarly, the time required for disengaging the first clutch CL1 can be reduced by immediately lowering the torque transfer capacity of the first clutch CL1 to the threshold torque transfer capacity (a), which does not require any torque compensation by the motor/generator MG.

Referring to FIG. 10, when a transition from the HEV mode to the EV mode is desired and there is a decrease in the required driving force, the following steps occur in sequence: S1→S2→S3→S4→S7. In step S7, a mode transition pattern (shown in FIG. 12), in which the first clutch CL1 is disengaged after the engine E is defueled, is selected.

Figure 12:
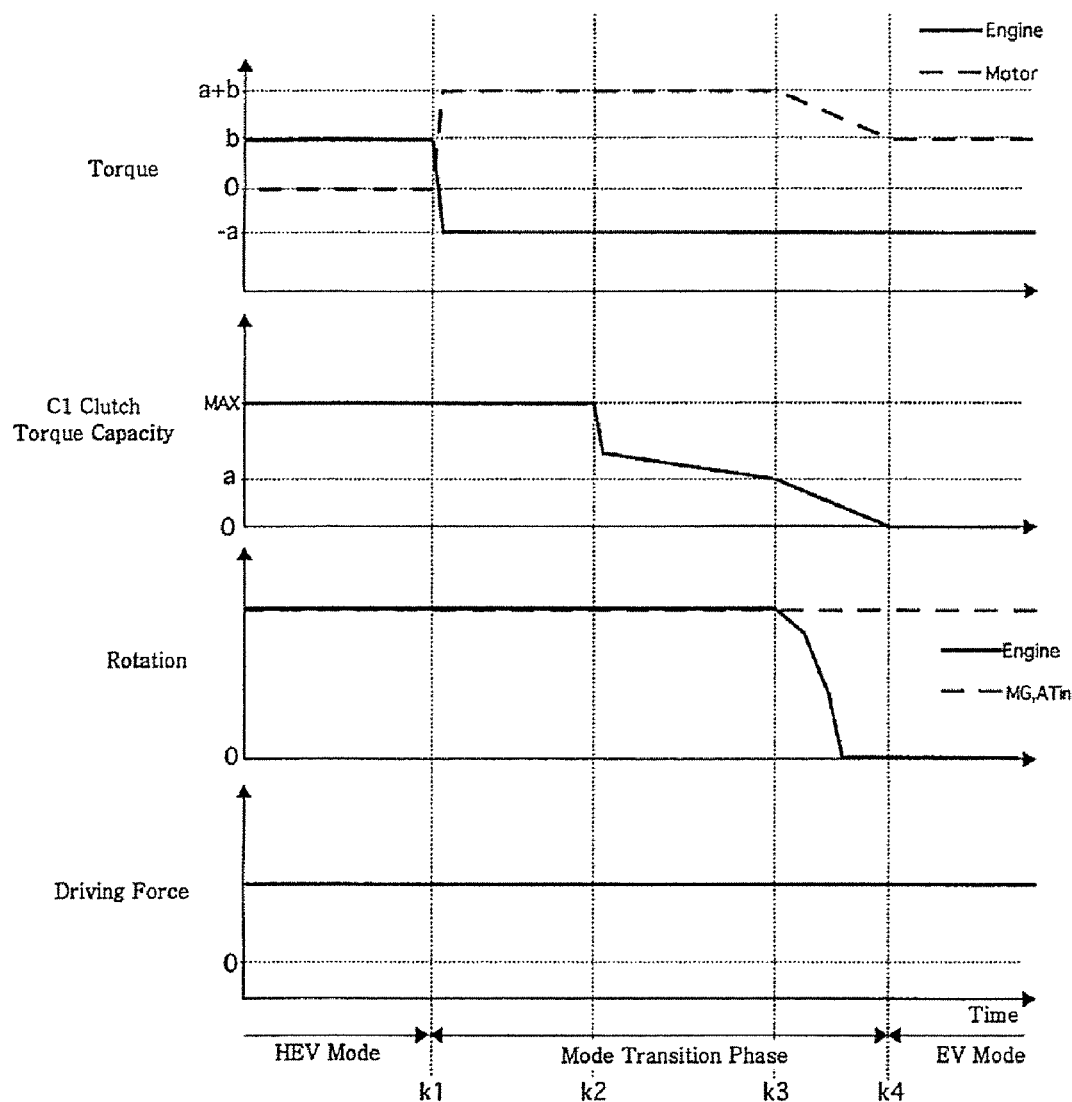
FIG. 12 is a diagram showing a mode transition pattern (second pattern) in which the engine stop is performed prior to the first clutch disengagement when the HEV mode is changed to the EV mode in the engine stop control.

The time chart shown in FIG. 12 demonstrates a mode transition when the HEV mode is changed to the EV mode by disengaging the first clutch CL1 after the engine E is defueled. Referring to FIG. 12, the time before reference symbol k1 indicates the HEV mode. Further, the time between the reference symbols k1-k4 indicates a mode transition from the HEV mode to the EV mode (referred to as "mode transition phase"). The disengagement of the first clutch CL1 and the stoppage of the engine E are performed by cooperatively controlling the engine E, the motor/generator MG and the first clutch CL1. The time after reference symbol k4 indicates the EV mode. The HEV mode, which is similar to the one shown in FIG. 11, can be described by the mode transition phase and the EV mode function.

The mode transition phase will be described first. Reference symbol k1 indicates the time in which a mode transition to the EV mode has already started and the defueling of the engine E begins. Also, the cooperative control of the engine E and the motor/generator MG begins based on the above equation (3'). After the time represented by reference symbol k1 passes, the engine torque Te is decreased by the engine defueling. However, the motor/generator torque is increased so as to compensate for such decrease. Therefore, there is no change in terms of driving force. Reference symbol k2 indicates the time in which the disengagement of the first clutch CL1 is commenced as the stoppage of the engine E and the driving force compensation by the motor/generator MG ends. Therefore, the torque transfer capacity of the first clutch CL1 becomes rapidly decreased. Reference symbol k3 indicates the time in which the first clutch CL1 begins to a slip because the torque transfer capacity of the first clutch CL1 has been lowered under the threshold torque transfer capacity (a). It is from the time point represented by reference symbol k3 in which the cooperative control of the first clutch CL1 and the motor/generator MG is commenced. A target motor/generator torque tTm, which compensates the drag torque of the first clutch CL1, can be obtained by the following equation.

$$tTm=tTin-Tcl1 \tag{3''}$$

By using the target motor/generator torque tTm, the change in driving force by the first clutch torque can be compensated.

The EV mode is now described. Reference symbol k4 indicates the time in which the first clutch torque transfer capacity becomes zero and reaches the EV mode by completely disengaging the first clutch CL1. Similar to the HEV mode, a target motor/generator torque tTm in the EV mode can be obtained by equation (2). However, the engine torque Te should be zero since the first clutch CL1 has been disengaged in the EV mode.

Similar to the forgoing, in the HEV control system of the present invention, the engine stop control means selects a second pattern, which disengages the first clutch CL1 after the defueling of the engine E, when the required driving force decreases at the time of mode transition from the HEV mode to the EV mode. For example, the driver's selection such as the release of accelerator has a drawback of increasing fuel consumption (similar to the first pattern). This is because fuel is consumed in maintaining the engine operation by using the mode transition pattern for delaying the fuel-cut of the engine E. However, in the preferred embodiment of the present invention, the fuel consumption can be reduced since the engine defueling can be performed early by selecting the second pattern, which disengages the first clutch after the defueling the engine E when the required driving force is decreased.

Referring to the flow chart shown in FIG. 10, when a transition from the HEV mode to the EV mode is desired and there is a rapid decrease in the required driving force, the following steps occur in sequence: S1→S2→S3→S4→S8. In step S8, a mode transition pattern (shown in FIG. 13), in which the disengagement of the first clutch CL1 and the fuel-cut of the engine E are simultaneously performed at the third pattern, is selected.

Figure 13:
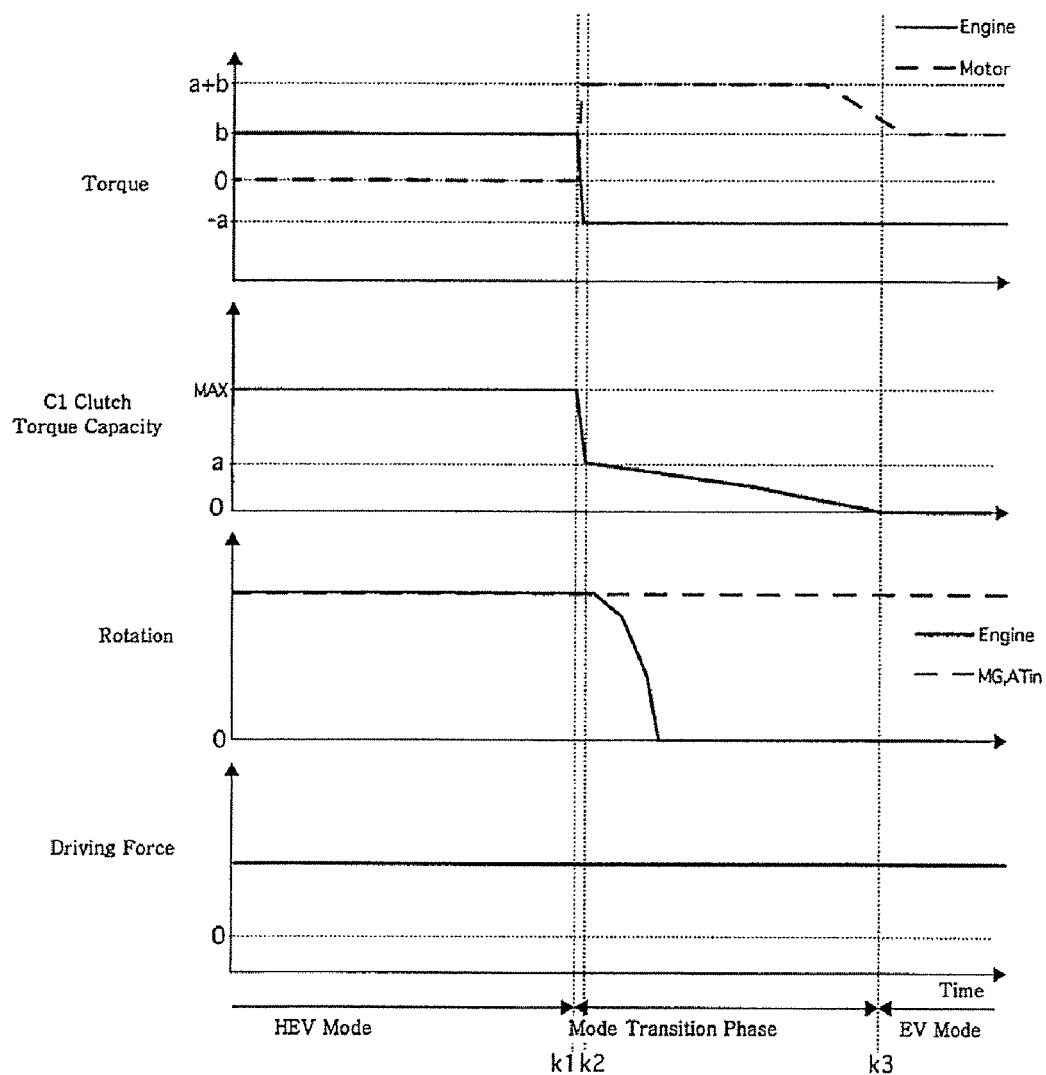
FIG. 13 is a diagram showing a mode transition pattern (third pattern) in which the engine stop and the first clutch disengagement are performed simultaneously when the HEV mode is changed to the EV mode in the engine stop control.

The time chart shown in FIG. 13 demonstrates a mode transition in which the HEV mode is changed to the EV mode by simultaneously performing the defueling of the engine E and the disengagement of the first clutch CL1. In the time chart, the time before reference symbol k1 indicates the HEV mode, whereas the time between reference symbols k1-k3 indicates a mode transition from the HEV mode to the EV mode (referred to as "mode transition phase"). The disengagement of the first clutch CL1 and the fuel-cut of the engine E are performed by cooperatively controlling the engine E, the motor/generator MG and the first clutch CL1. The time after reference symbol k3 indicates the EV mode. The HEV mode and the EV mode are controlled similarly as described with respect to FIG. 12. The time between reference symbols k1-k3 are further described below.

The mode transition phase will be described first. Reference symbol k1 indicates the time when a mode transition command to the EV mode has already started, while the defueling of the engine E and the disengagement of the first clutch CL1 simultaneously commence. Also, the cooperative control of the engine E, the first clutch CL1 and the motor/generator MG begin. At the time represented by reference symbol k1, the torque transfer capacity of the first clutch CL1 is immediately lowered to approximately the threshold torque transfer capacity (a). A target motor/generator torque tTm can be calculated using the following equation (3').

$$tTm=tTin-Te \tag{3'}$$

Reference symbol k2 indicates the time in which the first clutch CL1 begins to slip due to the lowering of the torque transfer capacity of the first clutch CL1 below the threshold torque transfer capacity (a) of the first clutch CL1. A target motor/generator torque tTm, which compensates the drag torque transfer capacity of the first clutch CL1, can be obtained using the following equation (3'').

$$tTm=tTin-Tcl1 \tag{3''}$$

As explained above, in the engine stop control system of the present invention, the engine stop control means simultaneously performs the fuel-cut of the engine E and the disengagement of the first clutch CL1, if the required driving force is rapidly decreased in the mode transition from the HEV mode to the EV mode. For example, there is a drawback in which the braking power is delayed when the required driving force has been rapidly decreased by the driver's selection such as slamming on the brakes. This is because the engine RPM needs to be reduced when using the second pattern. As such, in the preferred embodiment of the present invention, the defueling of the engine E and the disengagement of the first clutch CL1 are simultaneously performed if the required driving force is rapidly decreased due to the driver's selection. That is, the first clutch CL1 can be immediately disengaged and the braking power can be swiftly generated in case the required driving force has been rapidly decreased due to the driver's selection such as slamming on the brakes.

Referring to the flow chart shown in FIG. 10, when a transition from the HEV mode to the EV mode is desired and there is an increase in the required driving force, the following steps occur in sequence: S1→S2→S3→S4→S5→S9. In step S9, a mode transition pattern, in which a first clutch CL1 is disengaged after the defueling of the engine E at the second pattern, is selected (shown in FIG. 12).

FIG. 12 is a diagram illustrating a mode transition from the HEV mode to the EV mode, which is caused by disengaging the first clutch CL1 after the defueling of the engine E. Thus, there is no need to repeat the description such a mode transition herein.

Therefore, in the HEV control system of the present invention, the engine stop control means selects the second pattern, which disengages the first clutch CL1 after the defueling of the engine E, if the required driving force caused by the driver's selection has increased when the HEV mode is changed to the EV mode.

For example, although the required driving force has been increased due to pressing down on the accelerator for example, if the mode needs to be changed to the EV mode due to the rise in the battery SOC, there may be a drawback of continuing to fuel the engine E due to increased fuel consumption. This is because fuel would be consumed in maintaining the rotation of the engine by using an inappropriate mode transition pattern (e.g., first pattern), thus delaying the defueling of the engine E. However, in the preferred embodiment of the present invention, the fuel consumption can be reduced since the defueling of the engine can be performed early by selecting the second pattern, which opens the first clutch CL1 after the defueling of the engine E when the required driving force has been increased.

The HEV control system of the present invention can expect the following effects.

(1) The HEV control system further comprises a means (steps S3, S4 and S5) for detecting a change in the required driving force when the drive mode is transitioned from the HEV mode to the EV mode. The engine stop control means selects the most appropriate mode transition pattern among various mode transition patterns according to the change in the required driving force when the HEV mode is changed to the EV mode. Thus, it is possible to achieve the braking/driving power without making the driver feel uncomfortable.

(2) The engine stop control means has a first pattern (performs a defueling of the engine E after disengaging the first clutch CL1), a second pattern (disengages the first clutch CL1 after defueling the engine E) and a third pattern (simultaneously performs defueling of the engine E and the disengagement of the first clutch CL1). Thus, the most appropriate mode transition pattern can be selected from the above three mode transition patterns depending on the desired driving force indicated by the driver.

(3) The engine stop control means selects the first pattern, which performs the defueling of the engine E after disengaging the first clutch CL1, when the change in the required driving force is only slight at the time of mode transition from the HEV mode to the EV mode. Thus, the HEV mode can be changed to the EV mode without generating any shock caused by the defueling when the change in the required driving force due to the driver's selection is only slight.

(4) The engine stop control means compensates the torque change, which is accompanied with the disengagement of the first clutch CL1 by the torque of the motor/generator MG when the mode transitions from the HEV mode to the EV mode. Thus, any discomfort felt by the driver can be minimized.

(5) The engine stop control means immediately lowers the torque transfer capacity of the first clutch CL1 to the threshold torque transfer capacity (a) when disengaging the first clutch. Thus, the required time for disengaging the first clutch CL1 can be reduced.

(6) The engine stop control means selects the second pattern, which disengages the first clutch CL1 after the defueling of the engine E, when the required driving force is decreased at the time of mode transition from the HEV mode to the EV mode. Thus, fuel consumption can be reduced by performing the fuel-cut of the engine E early.

(7) The engine stop control means selects the third pattern, which simultaneously performs the fuel-cut of the engine E and the disengagement of the first clutch CL1, when the required driving force is rapidly decreased at the time of mode transition from the HEV mode to the EV mode. Thus, if the required driving force is suddenly reduced due to the driver's selection such as slamming on the brake, then a braking force can be rapidly generated by immediately disengaging the first clutch CL1.

(8) The engine stop control means selects the second pattern, which disengages the first clutch CL1 after defueling of the engine E, if the required driving force is increased when the mode transitions from the HEV mode to the EV mode. Thus, fuel consumption can be reduced by performing the defueling of the engine E early.

The engine stop control system of the present invention may be implemented in various manners such as those described above. Thus, it will be understood by those skilled in the art that various changes may be made to the engine stop control system without departing from the scope of the present invention.

The above preferred embodiment is an example of selecting the most proper mode transfer pattern among the three mode transfer patterns when transitioning from the HEV mode to the EV mode. However, it should be contemplated that there can be another mode transfer pattern utilizing an overlap gap (e.g., gap between the defueling and the first-clutch disengagement), which may be added as an additional pattern, thereby broadening the range of mode transition pattern selection. Thus, the present invention is not just limited to the above-described preferred embodiment and the mode transition pattern selection may be widened depending on the required driving force as selected by the driver.

Further, when the required driving force is reduced, the change in torque may be compensated by the motor/generator using the engine stop and the first clutch disengagement during the mode transition phase, thereby stabilizing the driving force. Further, it may be possible to initiate engine defueling prior to the EV mode in response to the reduction in the required driving force. Also, when the required driving force is increased, the amount of compensation needed to accommodate such force can be provided by the motor generation torque. In such a case, it may be possible to increase the driving force before implementing the EV mode.

Although the above descriptions are made in the context of a rear-wheel drive hybrid vehicle, it is contemplated herein that a front-wheel drive or four-wheel drive hybrid vehicle may be used in lieu of a rear-wheel drive vehicle. Further, even though the clutch may be installed within an automotive transmission, it may be preferable to install the second clutch between the motor/generator and the transmission or between the transmission and the drive wheel. In addition, the first clutch is preferably installed between the engine and the motor/generator to thereby enable the continuous change in the torque transfer capacity.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A hybrid vehicle drive control system for controlling an engine, a motor/generator and a clutch in a vehicle drivetrain, the clutch located between the engine and the motor/generator and having a controllable torque transfer capacity, the control system comprising:

a controller configured to selectively operate the vehicle in a hybrid drive mode in which the clutch is engaged and in an electric drive mode in which the clutch is disengaged, the controller being further configured select a predetermined mode transition pattern for disengaging the clutch and stopping the engine from a plurality of predetermined mode transition patterns while a driving mode is changed from the hybrid drive mode to the electric drive mode based on a condition indicative of a change in driving force of the vehicle, the plurality of mode transition patterns including a first pattern that disengages the clutch prior to stopping the engine, a second pattern that stops the engine prior to disengaging the clutch, and a third pattern that simultaneously stops the engine and disengages the clutch.

2. The hybrid vehicle control system of claim 1 wherein the controller is further configured to select the first pattern when the change in the indicated driving force selected by the driver is slight compared to a predetermined value when changing from the hybrid drive mode to the electric drive mode.

3. The hybrid vehicle control system of claim 2 wherein the controller is further configured to compensate a torque change when changing from the hybrid drive mode to the electric drive mode by using a torque produced from the motor/generator.

4. The hybrid vehicle control system of claim 2 wherein the controller is further configured to reduce the torque transfer capacity of the clutch when the clutch is disengaged.

5. The hybrid vehicle control system of claim 1 wherein the controller is further configured to select the second pattern when the indicated driving force is reduced in transition from the hybrid drive mode to the electric drive mode.

6. The hybrid vehicle control system of claim 1 wherein the controller is further configured to select the third pattern when the indicated driving force is reduced more than a predetermined ratio in transition from the hybrid drive mode to the electric drive mode.

7. The hybrid vehicle control system of claim 1 wherein the controller is further configured to select the second pattern when the indicated driving force is increased in transition from the hybrid drive mode to the electric drive mode.

8. The hybrid vehicle control system of claim 1 wherein the controller is further configured to:
   select the first pattern when the change in the indicated driving force selected by the driver is slight compared to a predetermined value when changing from the hybrid drive mode to the electric drive mode;
   select the second pattern when the indicated driving force is reduced in transition from the hybrid drive mode to the electric drive mode;
   select the second pattern when the indicated driving force is increased in transition from the hybrid drive mode to the electric drive mode; and
   select the third pattern when the indicated driving force is reduced more than a predetermined ratio in transition from the hybrid drive mode to the electric drive mode.

9. A hybrid vehicle control system for controlling a hybrid vehicle having a hybrid driving system with an engine, a motor/generator, a transmission and a clutch installed between the engine and the motor/generator to change a torque transfer capacity, the hybrid vehicle control system operative to perform a mode transition of disengaging the clutch and defueling the engine while a driving mode is changed to an electric drive mode in which the vehicle is driven by the motor/generator from a hybrid drive mode in which the vehicle is driven by the engine and the motor/generator, the hybrid vehicle control system being characterized in that:
   the hybrid vehicle control system is operative to detect a changed driving force when the driving mode is changed to the electric drive mode from the hybrid drive mode; and
   the hybrid vehicle control system is operative to select an appropriate mode transition pattern from a plurality of mode transition patterns according to a required driving force selected by a driver while the driving mode is changed to the electric drive mode from the hybrid drive mode,
   the plurality of mode transition patterns including a first pattern that disengages the clutch prior to stopping the engine, a second pattern that stops the engine prior to disengaging the clutch, and a third pattern that simultaneously stops the engine and disengages the clutch.

10. A hybrid vehicle control system for use in controlling a vehicle driveline including an engine; a motor/generator; a transmission; and a clutch installed between the engine and the motor/generator, the clutch having a controllable torque transfer capacity; the hybrid vehicle control system comprising:
   an engine controller, coupled to the engine;
   a motor controller, coupled to the motor/generator;
   a clutch controller, coupled to the clutch; and
   an integrated controller, coupled to the engine controller, the motor controller and the
   clutch controller, the integrated controller including:
      a target driving force calculation unit, configured to receive a vehicle speed input and an indicated driving force input and to generate a target driving force output,
      a mode selection unit, configured to receive the vehicle speed input and the indicated driving force input and to calculate a target mode as an output, and
      an operating point command unit, configured to receive the vehicle speed input, the indicated driving force input, the target driving force output, and the target mode output, to select a mode transition pattern from a plurality of mode transition patterns during transitioning from a hybrid drive mode to an electric drive mode and to provide a target engine torque output to the engine controller, a target motor/generator torque output to the motor controller, and clutch torque transfer capacity command to the clutch controller;
   the plurality of mode transition patterns including a first pattern that disengages the clutch prior to stopping the engine, a second pattern that stops the engine prior to disengaging the clutch, and a third pattern that simultaneously stops the engine and disengages the clutch.

11. The hybrid vehicle control system of claim 10 wherein the operating point command unit is further configured to: select the first pattern when a change in an indicated driving force is slight compared to a predetermined value; select the second pattern when the indicated driving force is reduced, and select the third pattern when the indicated driving force is reduced more than a predetermined ratio.

12. The hybrid vehicle control system of claim 10 wherein the operating point command unit is further configured to provide as part of the target motor/generator torque output a torque which is sufficient to compensate for a drag torque in the clutch when transitioning from the hybrid drive mode to the electric drive mode.

13. The hybrid vehicle control system of claim 10 wherein the operating point command unit is further configured to provide commands to reduce the torque transfer capacity of the clutch when the clutch is disengaged.

14. The hybrid vehicle control system of claim 10, wherein the integrated controller further includes a target charge/discharge calculation unit configured to receive a battery state of charge input and to generate a target charge/discharge power output, and
   the operating point command unit is further configured to receive the target charge/discharge power output and to select the second pattern when the battery state of charge exceeds a predetermined threshold and indicated driving force is increased.

15. The hybrid vehicle control system of claim 10, wherein the operating point command unit is further configured to generate a target transmission shift output; and the integrated controller further includes a transmission control unit configured to receive the target transmission shift output and to generate commands to the transmission.

* * * * *